(12) United States Patent
Baghel

(10) Patent No.: US 10,117,224 B2
(45) Date of Patent: Oct. 30, 2018

(54) MAC SUBHEADER FOR D2D BROADCAST COMMUNICATION FOR PUBLIC SAFETY

(71) Applicant: QUALCOMM Incorporated, San Diego, CA (US)

(72) Inventor: Sudhir Kumar Baghel, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/483,962

(22) Filed: Sep. 11, 2014

(65) Prior Publication Data

US 2015/0085791 A1 Mar. 26, 2015

Related U.S. Application Data

(60) Provisional application No. 61/880,792, filed on Sep. 20, 2013.

(51) Int. Cl.
```
H04W 72/00    (2009.01)
H04W 76/14    (2018.01)
H04W 4/06     (2009.01)
H04W 76/40    (2018.01)
H04W 92/18    (2009.01)
H04W 4/08     (2009.01)
```
(Continued)

(52) U.S. Cl.
CPC ........... *H04W 72/005* (2013.01); *H04W 4/06* (2013.01); *H04W 72/00* (2013.01); *H04W 76/14* (2018.02); *H04W 4/08* (2013.01); *H04W 28/06* (2013.01); *H04W 76/40* (2018.02); *H04W 88/04* (2013.01); *H04W 92/18* (2013.01)

(58) Field of Classification Search
None
See application file for complete search history.

(56) References Cited

U.S. PATENT DOCUMENTS

2012/0040700 A1* 2/2012 Gomes ................ H04W 4/003
                                                   455/500
2012/0281628 A1* 11/2012 Park ..................... H04J 11/0079
                                                   370/328

(Continued)

OTHER PUBLICATIONS

General Dynamics Broadband UK: "Nature and Scope of System Enablers for Group Communications" 3GPP Draft; S1-123018, 3rd Generation Partnership Project (3GPP), Mobile Competence Centre ; 650, Route Des Lucioles ; F-06921 Sophia-Antipolis Cedex; France vol. SA WG1. No. Edinburgh. Scotland; Nov. 8, 2012-Nov. 9, 2012 Nov. 1, 2012 (Nov. 1, 2012), XP050681965, Retrieved from the Internet: URL: http://www.3gpp.org/ftp/tsg_sa/WG1_Serv/TSGS160GCSEadhoc/docs/ [retrieved-on Nov. 1, 2012] p. 4. paragraph.

(Continued)

*Primary Examiner* — Chirag G Shah
*Assistant Examiner* — Suk Jin Kang
(74) *Attorney, Agent, or Firm* — Clint R. Morin; Arent Fox

(57) ABSTRACT

A method, an apparatus, and a computer program product for wireless communication are provided. The apparatus configures at least a non-access stratum (NAS) protocol layer or a radio resource control (RRC) protocol layer to enable device-to-device (D2D) communication with at least a second apparatus when the apparatus is out of network coverage, and communicates with at least the second apparatus.

27 Claims, 21 Drawing Sheets

(51) Int. Cl.
*H04W 28/06* (2009.01)
*H04W 88/04* (2009.01)

(56) References Cited

U.S. PATENT DOCUMENTS

| | | | |
|---|---|---|---|
| 2013/0114531 A1 | 5/2013 | Ahn et al. | |
| 2013/0265984 A1 | 10/2013 | Li et al. | |
| 2013/0272186 A1* | 10/2013 | Mohanty | H04W 4/06 370/312 |
| 2013/0272196 A1* | 10/2013 | Li | H04W 72/044 370/328 |
| 2013/0315079 A1 | 11/2013 | Edge | |
| 2013/0324114 A1* | 12/2013 | Raghothaman | H04W 76/023 455/426.1 |
| 2014/0003320 A1* | 1/2014 | Etemad | H04W 4/06 370/312 |
| 2014/0056220 A1* | 2/2014 | Poitau | H04W 40/246 370/328 |
| 2014/0162633 A1 | 6/2014 | Hwang et al. | |
| 2014/0162688 A1* | 6/2014 | Edge | H04W 8/005 455/456.1 |
| 2014/0185495 A1* | 7/2014 | Kuchibhotla | H04W 76/023 370/281 |
| 2014/0185530 A1* | 7/2014 | Kuchibhotla | H04W 72/0446 370/329 |
| 2014/0187283 A1* | 7/2014 | Nimbalker | H04W 72/048 455/550.1 |
| 2014/0241262 A1* | 8/2014 | Novak | H04W 72/042 370/329 |
| 2014/0243038 A1* | 8/2014 | Schmidt | H04W 76/023 455/552.1 |
| 2015/0004901 A1* | 1/2015 | Agiwal | H04W 76/023 455/39 |
| 2015/0029866 A1* | 1/2015 | Liao | H04W 4/008 370/241 |
| 2015/0043448 A1* | 2/2015 | Chatterjee | H04W 8/005 370/329 |
| 2015/0110038 A1* | 4/2015 | Yang | H04W 72/042 370/329 |
| 2015/0163689 A1* | 6/2015 | Lee | H04W 24/10 370/328 |
| 2015/0181587 A1* | 6/2015 | Yang | H04W 72/042 370/329 |
| 2015/0181593 A1* | 6/2015 | Kim | H04W 52/0216 370/329 |
| 2015/0208452 A1* | 7/2015 | Lee | H04W 36/0061 455/426.1 |
| 2015/0230284 A1* | 8/2015 | Nimbalker | H04W 72/048 455/450 |
| 2015/0351020 A1* | 12/2015 | Lin | H04W 8/005 455/404.1 |
| 2015/0351059 A1* | 12/2015 | Seo | H04W 56/002 370/350 |
| 2015/0351127 A1* | 12/2015 | Park | H04J 11/0079 370/336 |
| 2015/0358801 A1* | 12/2015 | Seo | H04L 5/00 370/329 |
| 2016/0007336 A1* | 1/2016 | Fukuta | H04W 52/383 455/426.1 |
| 2016/0013918 A1* | 1/2016 | Zhang | H04L 1/0016 370/329 |
| 2016/0057795 A1* | 2/2016 | Kim | H04W 76/023 370/329 |
| 2016/0143078 A1* | 5/2016 | Jeong | H04W 76/023 370/329 |
| 2016/0157080 A1* | 6/2016 | Agiwal | H04W 8/005 370/328 |
| 2016/0157172 A1* | 6/2016 | Jeong | H04W 36/0083 370/329 |

OTHER PUBLICATIONS

International Search Report and Written Opinion—PCT/US2014/055678—ISA/EPO—dated Jun. 19, 2015.
Qualcomm Incorporated, et al., "Direct conmunication one-to-many", 3GPP Draft; S2-131820-Direct-Communication-Onetomany-R6, 3rd Generation Partnership Project (3GPP), Mobile Competence Centre; 650, Route Des Lucioles ; F-06921 Sophia-Antipolis Cedex ; France vol. SA WG2. No. Busan. South Korea; May 27, 2013-May 31, 2013 May 21, 2013 (May 21, 2013), XP050708998, Retrieved from the Internet: URL: http://www.3gpp.org/ftp/tsg_sa/WG2_Arch/TSGS2 97Busan/Docsf [retrieved-on May 21, 2013] the whole.
Wi-Fi Alliance: "Wi-Fi Peer-to-Peer (P2P) Specification v1.1 ", Wi-Fi Alliance Specification, Jan. 1, 2010 (Jan. 1, 2010), pp. 1-159, XP009163866.
"3rd Generation Partnership Project; Technical Specification Group Services and System Aspects; Study on architecture enhancements to support Proximity Services (ProSe) (Release 12)", 3GPP Standard; 3GPP TR 23.703, 3rd Generation Partnership Project (3GPP), Mobile Competence Centre; 650, Route Des Lucioles; F-06921 Sophia-Antipolis Cedex; France, vol. SA WG2, No. V0.5.0, Jul. 27, 2013 (Jul. 27, 2013), pp. 1-175, XP050712257, [retrieved on Jul. 27, 2013].
"L2 Protocols for D2D", 3GPP Draft; R2-132494 L2 Protocols for D2D, 3rd Generation Partnership Project (3GPP), Mobile Competence Centre; 650, Route Des Lucioles; F-06921 Sophia-Antipolis Cedex; France, vol. RAN WG2, No. Barcelona, Spain; Aug. 19, 2013-Aug. 23, 2013, Aug. 9, 2013 (Aug. 9, 2013), XP050718198, Retrieved from the Internet: URL:http://www.3gpp.org/ftp/tsg_ran/WG2_RL2/TSGR2_83/Docs/ [retrieved on Aug. 9, 2013].
Partial International Search Report—PCT/US2014/055678—ISA/EPO—dated Apr. 7, 2015.
Doppler K., et al., "Device-to-Device Communication as an Underlay to LTE-Advanced Networks", IEEE Communications Magazine, Dec. 2009, vol. 47 (12), pp. 42-49.

\* cited by examiner

| R 1102 | R 1104 | E 1106 | LCID 1108 | | | | | |
|---|---|---|---|---|---|---|---|---|
| | | | SESSION ID 1110 | NUM GROUP 1112 | | | | |
| | | | GROUP ID 1 1114 | ••• | GROUP ID n 1116 | SOURCE ID 1118 | F 1120 | L 1122 |

| R 1302 | R 1304 | E 1306 | LCID 1308 |
|---|---|---|---|
| | | | SDU NUM 1312 |
| SESSION ID 1310 | | | |
| GROUP ID 1314 | | | |
| SOURCE ID 1316 | | | |
| F 1318 | | | L 1320 |

FIG. 13

| SESSION ID 1702 | GROUP ID 1704 | SOURCE ID 1706 |

| GROUP ID 1802 | SOURCE ID 1804 | PRIORITY 1806 |
|---|---|---|
| | | NA TIME 1808 |

MAC SUBHEADER FOR D2D BROADCAST COMMUNICATION FOR PUBLIC SAFETY

CROSS-REFERENCE TO RELATED APPLICATIONS

This application claims the benefit of U.S. Provisional Application Ser. No. 61/880,792 entitled "MAC SUBHEADER FOR D2D BROADCAST COMMUNICATION FOR PUBLIC SAFETY" and filed on Sep. 20, 2013, which is expressly incorporated by reference herein in its entirety.

BACKGROUND

Field

The present disclosure relates generally to communication systems, and more particularly, to a MAC subheader for D2D broadcast communication for public safety.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus configures at least a non-access stratum (NAS) protocol layer or a radio resource control (RRC) protocol layer to enable device-to-device (D2D) communication with at least a second apparatus when the apparatus is out of network coverage, and communicates with at least the second apparatus.

BRIEF DESCRIPTION OF THE DRAWINGS

FIG. 11 is a diagram illustrating a format of a MAC subheader for D2D broadcast communication.

FIG. 13 is a diagram illustrating a format of a MAC subheader for D2D broadcast communication.

FIG. 17 is a diagram illustrating a format of a new MAC CE for group session announcement in D2D broadcast communication.

FIG. 18 is a diagram illustrating a format of a new MAC CE for group session announcement in D2D broadcast communication.

DETAILED DESCRIPTION

Figure 1:
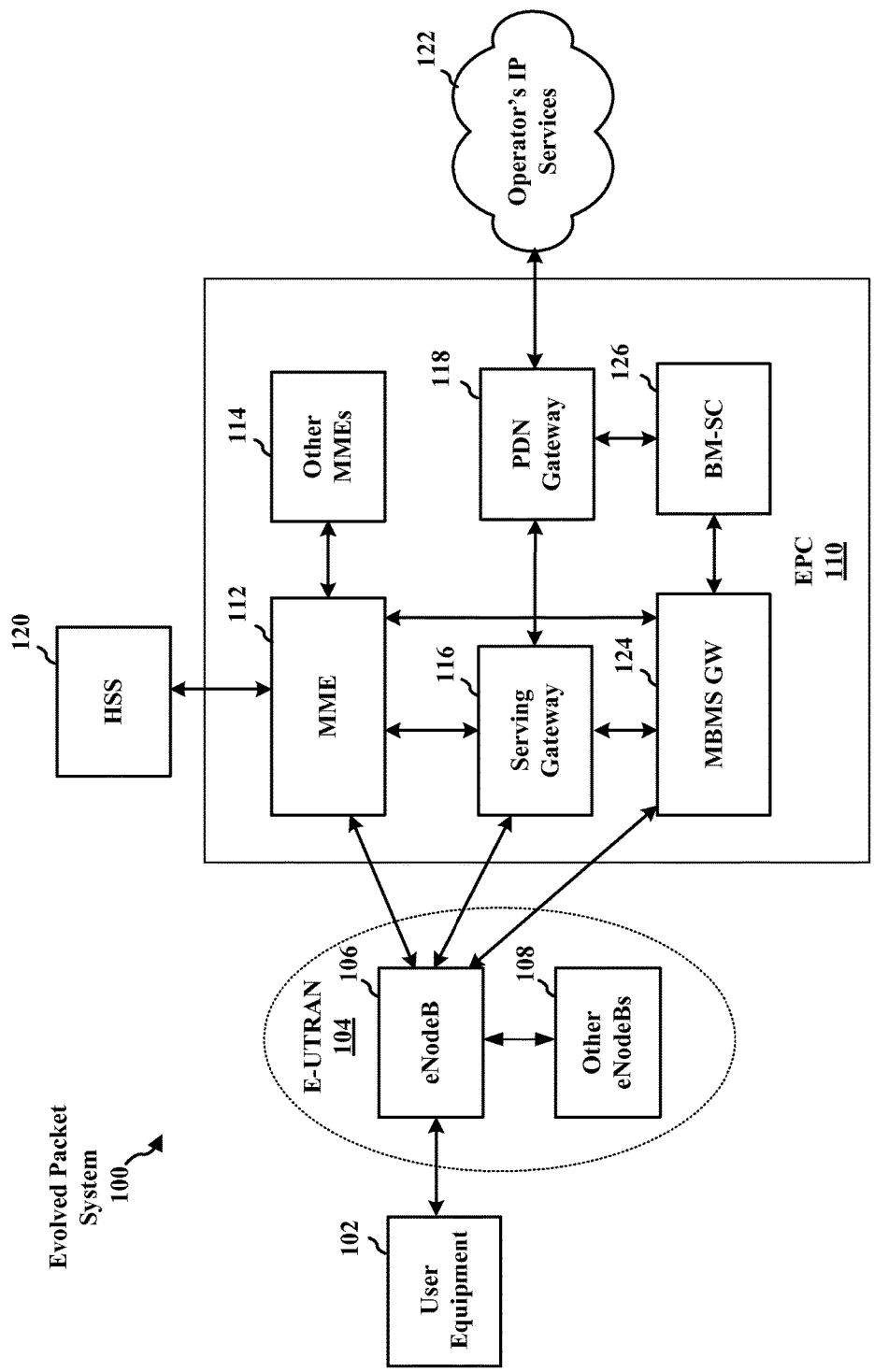
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
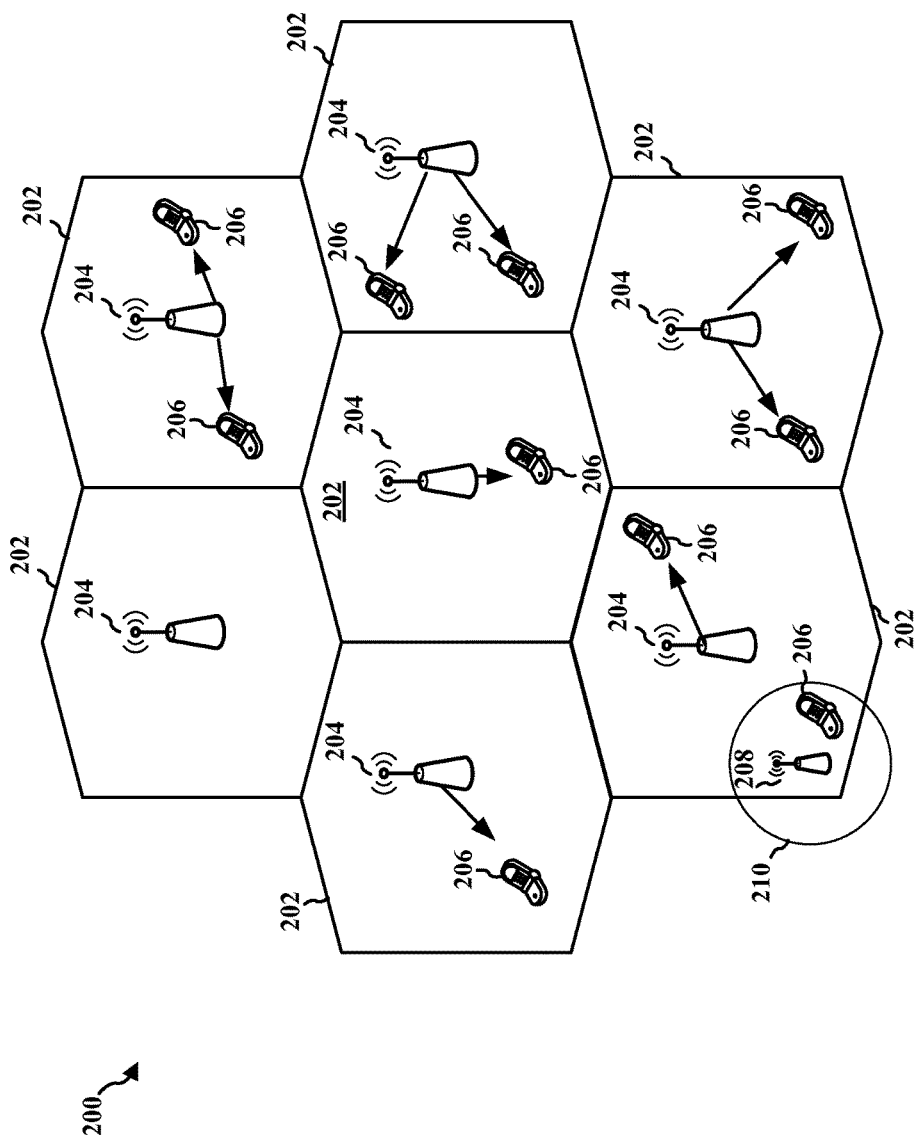
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
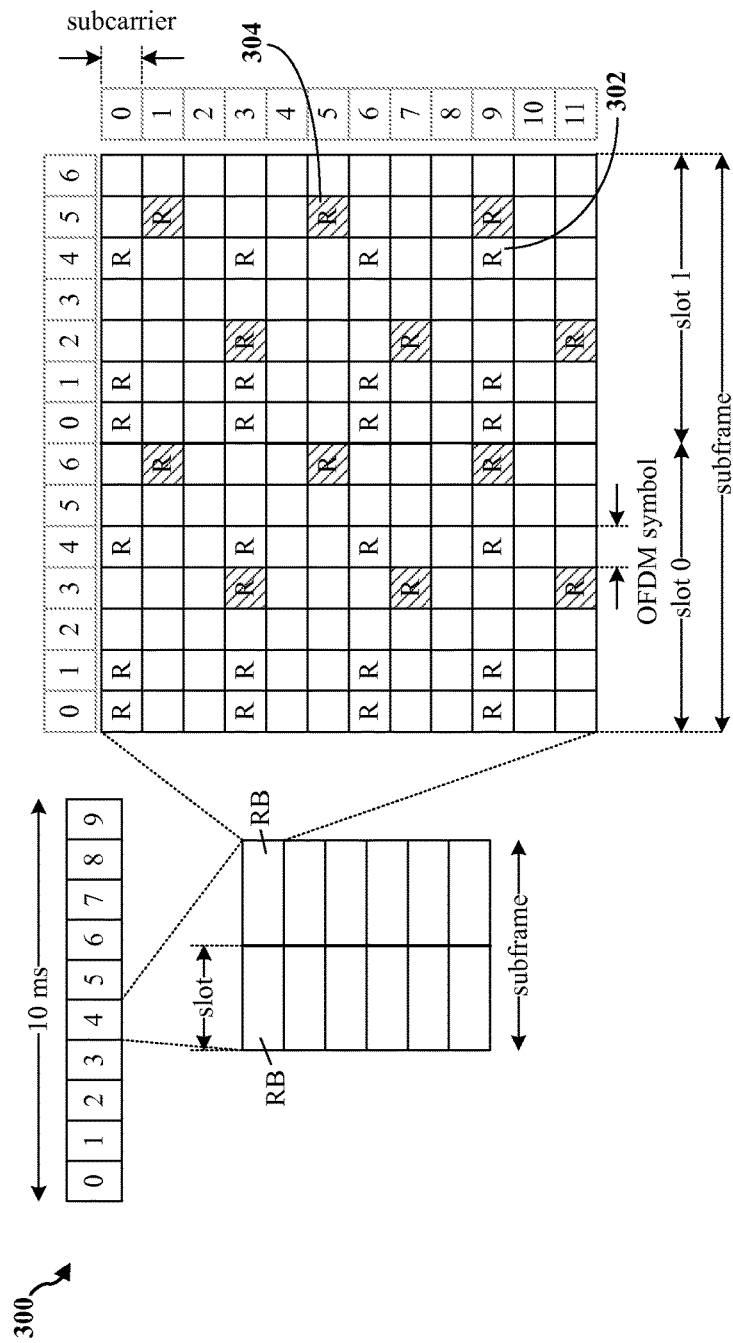
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
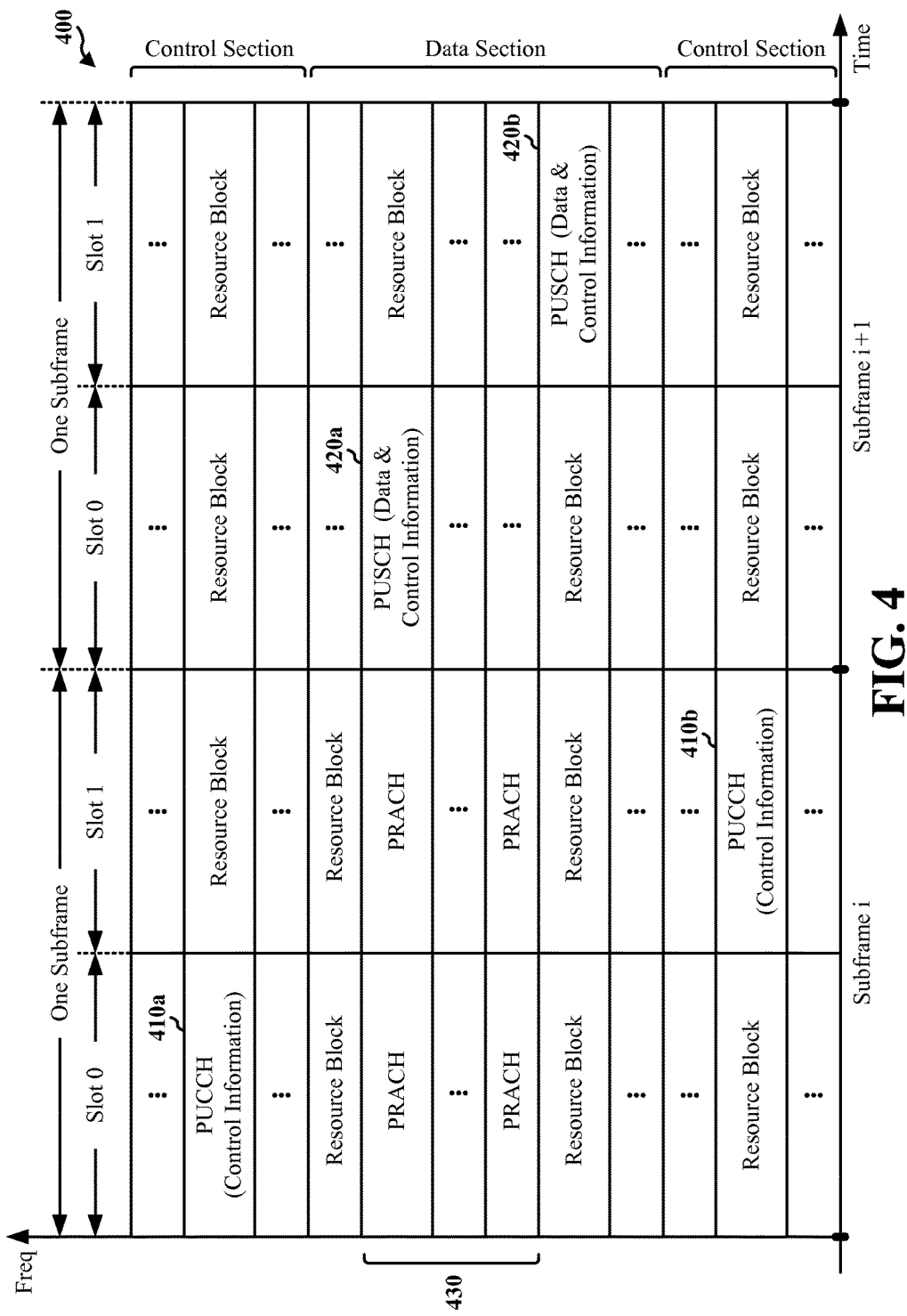
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
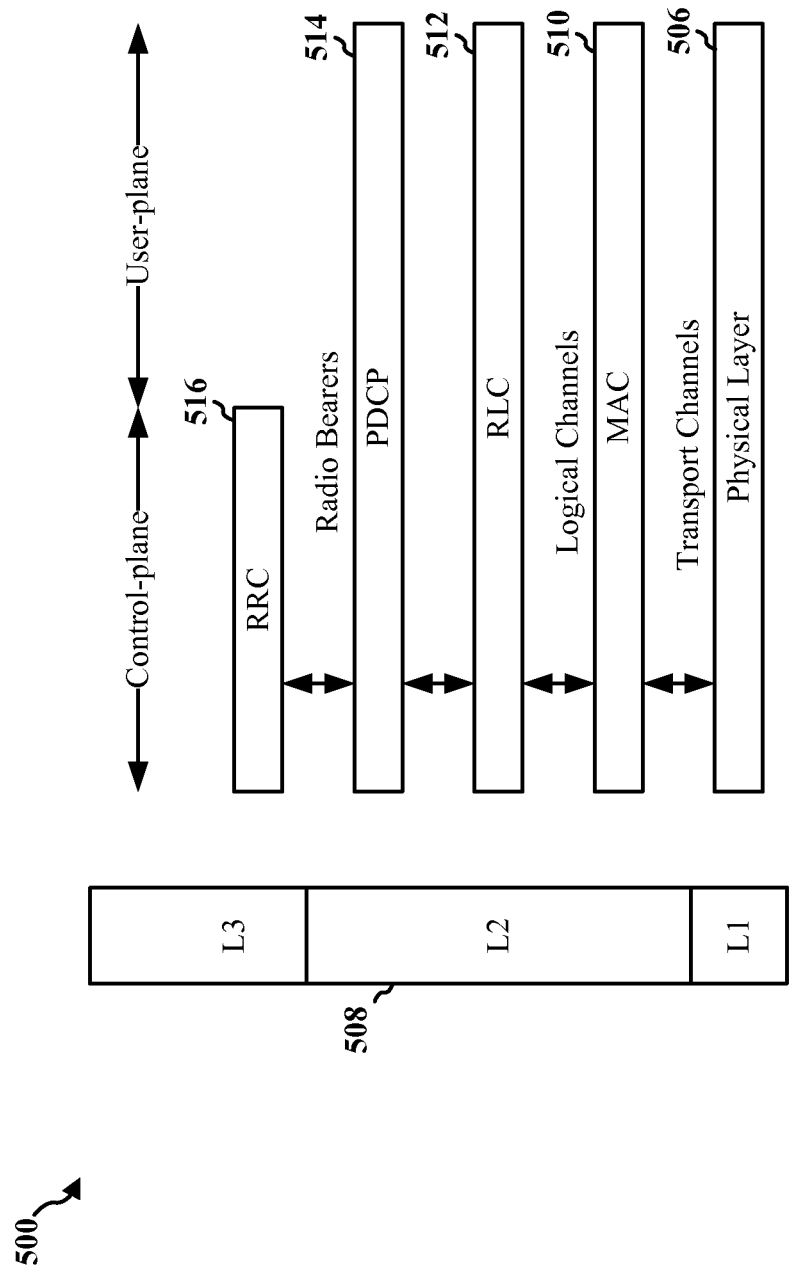
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
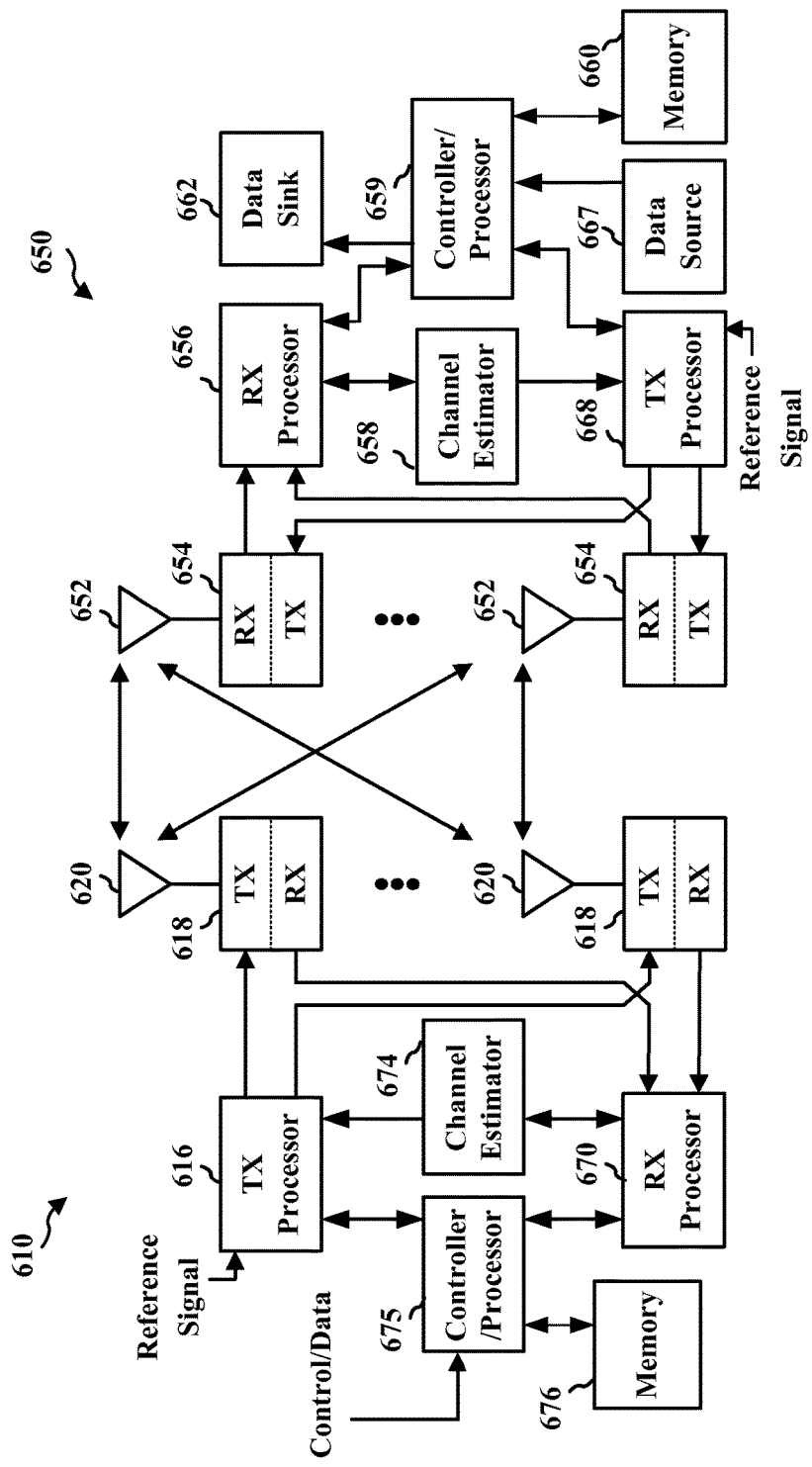
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
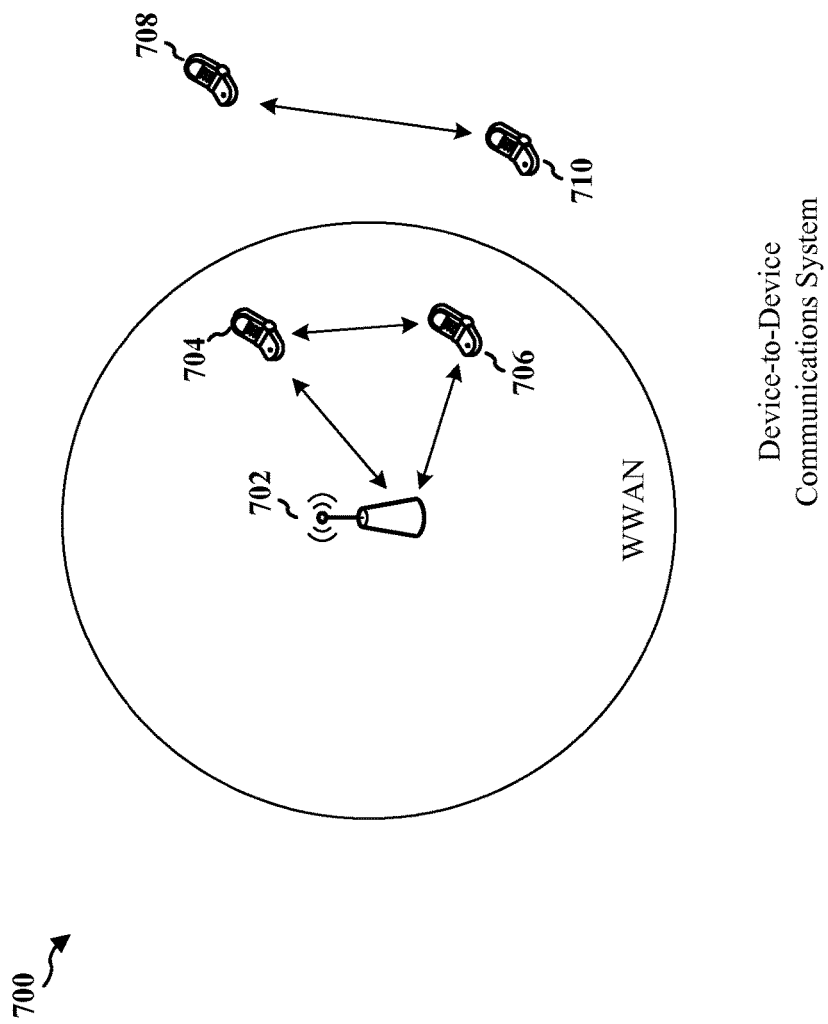
FIG. 7 is a diagram of a device-to-device communications system.

FIG. 7 is a diagram of a device-to-device (D2D) communications system 700. The D2D communications system 700 includes a plurality of wireless devices (also referred to as UEs) 704, 706, 708, 710. The D2D communications system 700 may overlap with a cellular communications system, such as for example, a wireless wide area network (WWAN). Some of the wireless devices 704, 706, 708, 710 may communicate together in D2D communication using the DL/UL WWAN spectrum, some may communicate with the base station 702, and some may do both. For example, as shown in FIG. 7, the wireless devices 708, 710 are in D2D communication and the wireless devices 704, 706 are in D2D communication. The wireless devices 704, 706 are also communicating with the base station 702. In the configuration of FIG. 7, the wireless devices 708 and 710 are out of network coverage and, therefore, may not receive assistance from base station 702. As described herein, the term "out of network coverage" may refer to a situation where the wireless devices 708 and 710 are out of the communication range of the base station 702 or a situation where the base station 702 is not functional.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless D2D communication systems.

D2D one-to-many broadcast communication is the mechanism for communication between UEs of a group for public safety. As discussed infra, D2D broadcast communication can be achieved by reusing at least a portion of the LTE protocol stack.

Figure 8:
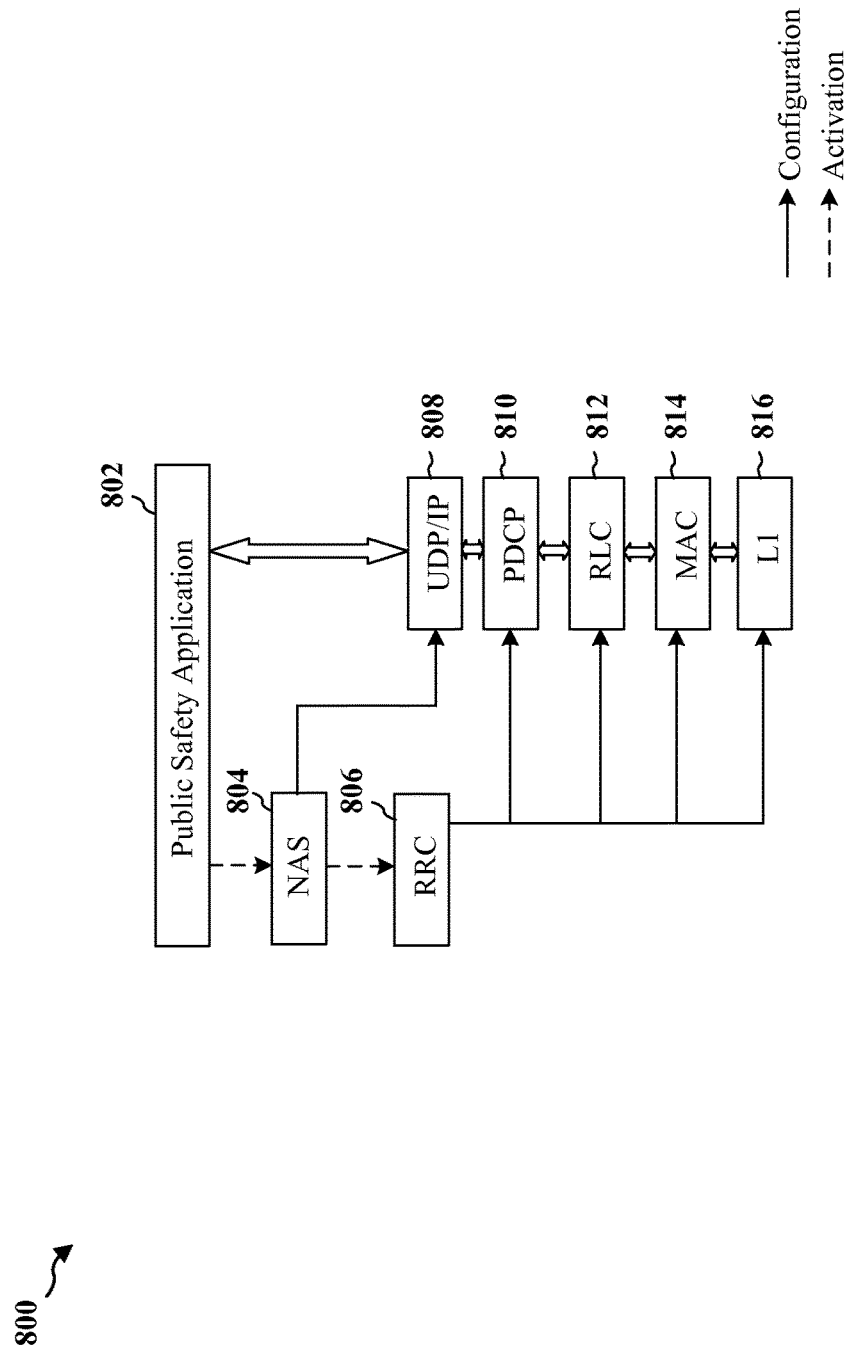
FIG. 8 is a diagram illustrating a protocol architecture for D2D broadcast communication for public safety.

FIG. 8 is a diagram illustrating a protocol architecture 800 of a first UE for D2D broadcast communication for public safety. As shown in FIG. 8, the protocol architecture 800 includes a public safety application 802, a non-access stratum (NAS) protocol layer (also referred to as "NAS") 804, an RRC protocol layer 806, a user datagram protocol (UDP)/IP layer 808, a PDCP layer 810, an RLC layer 812, a MAC layer 814, and a physical layer (L1) 816.

In an aspect, when an application (e.g., public safety application 802) is activated by a user of a UE (e.g., UE 708), the public safety application 802 may send an indication to the NAS 804. For example, the application may be a public safety application used for communicating emergency messages by members of a police department, fire department, or other public safety personnel. In response to the indication, NAS 804 may configure itself and may optionally configure RRC 806. In an aspect, the configuration performed by NAS 804 may involve setting an individual IP address for the UE, a priority for the groups handling, and an IP multicast address for the groups where the UE has the group membership. The NAS 804 may also configure a bearer specific to D2D broadcast communication and associated traffic flow templates (TFTs).

In an aspect, the RRC 806 can autonomously transition to a D2D communication state to allow for D2D communication with one or more UEs (e.g., UE 710) when the UE 708 is out of network coverage. In an aspect, such autonomous transition can be achieved by an indication (e.g., a broadcast public safety communication indication) received by the RRC 806 from either the public safety application 802 running on the UE 708 or from NAS 804 when NAS 804 receives this indication from the public safety application 802. For example, whenever the public safety application 802 is initiated by the user of the UE 708, the previously described indication may be provided to the RRC 806. In response to the indication, the RRC 806 may transition to a new state (e.g., a "D2D-Idle" state or a "D2D-Connected" state, which may also collectively be referred to as a "D2D communication state") with respect to the presently available RRC states (e.g., "RRC Idle" or "RRC Connected"). The new state of the RRC 806 is specific for D2D broadcast communication operation. When the RRC 806 transitions to this new state, such transition does not affect WAN RRC state.

The transition from the D2D-Idle state to the D2D-Connected state can take place in following manner. In an aspect, when the public safety application 802 is activated in the UE 708, the RRC 806 enters the D2D-Idle state. If the UE 708 has something to transmit, the UE 708 enters the D2D-Connected state and transmits an identity of the group (e.g., a group ID) to which the UE 708 belongs and/or an identity of the transmitter (e.g., a source ID associated with the UE 708) on one particular channel to which all other D2D-Idle UEs are listening. Alternatively, the UE 708 transmits the group ID and/or source ID in a specified time slot which all other D2D-Idle UEs are listening.

In an aspect, UEs belonging to the same group enter the D2D-Connected state and start to monitor the complete band. After transmitting a group activation (or group session announcement) for some predefined times, the UE 708 may begin transmission. Accordingly, since UEs of a particular group enter the D2D-Connected state at times when transmissions will occur, the previously described aspect may reduce power consumption in the UEs during D2D communications.

In an aspect, when a public safety application is activated, the UE 708 may enter the D2D-Connected state. In such aspect, all the UEs in the group may enter and remain in the D2D-Connected state all the time (as soon as the public safety application 802 is activated). In an aspect, a group session announcement may be transmitted by the UE 708 to prevent all UEs from entering and remaining in the D2D-Connected state all the time. For example, once a session announcement is received by a UE, the UE may start to monitor each subframe (assigned for D2D communication) for the duration of a preconfigured in-activity timer. This in-activity timer is reset every time a packet is sent/received before entering the D2D-Idle state. A session ID can also be part of group session announcement and there can be one in-activity timer per session ID. The session ID can be part of each MAC subheader and session announcement MAC CE as explained infra.

When the RRC 806 transitions to the new state specific for D2D broadcast communication in response to an indication from the public safety application 802, the RRC 806 may configure other protocol layers, such as the PDCP layer 810, the RLC layer 812, the MAC layer 814, and/or the physical layer 816 for D2D broadcast operation. The RRC 806 can have this information pre-configured so that the RRC 806 can work in an out of network coverage scenario as well.

In an aspect, since there is no peer to peer connection, public safety broadcast communication can be considered as a connectionless approach. Therefore, there may be no need for connection management.

Header compression can help reduce the header size in D2D transmissions. However, since feedback from PDCP is not available when the UE 708 is out of network coverage, header compression without feedback may be needed. PDCP may perform robust header compression (ROHC), which supports three modes. One such mode, known as unidirectional mode (or U-Mode), can be used for header compression without feedback. In the U-Mode, the transmitter (e.g., UE 708) periodically sends a full header to enable the decompressor to avoid errors. The other two modes supported by ROHC are bidirectional and require feedback. Therefore, in an aspect, the other two modes may not be used for public safety broadcast communication.

As previously discussed, feedback may not be needed for public safety broadcast communication so RLC U-Mode can be used for user data without any change. In an aspect, there may be no need to transfer any control plane messages and, therefore, TM mode may not be needed.

Figure 9:
FIG. 9 is a diagram illustrating a format of a MAC subheader for D2D broadcast communication.

FIG. 9 is a diagram illustrating a format of a MAC subheader 900 for D2D broadcast communication. As shown in FIG. 9, the MAC subheader 900 inlcudes reserved header fields 902 and 904, extension header field 906, logical channel ID (LCID) field 908, group ID field 910, source ID field 912, format field 914, and length field 916.

A MAC (e.g., MAC layer 814) may perform a multiplexing function with respect to broadcast communication. To achieve such function, a new logical channel may be defined for D2D broadcast communication (e.g., D-BCCH). D-BCCH maps to the transport channel defined by RAN1 for broadcast communication for public safety. The broadcast of one group may need to be distinguished from another group so that a UE (e.g., UE 708) forwards only relevant packets (e.g., packets belonging to the groups of interest to a UE) to upper layers for further processing. This can be achieved by embedding a group ID into each packet transmitted by any transmitter of the group. For example, a Direct Group ID (DGI) can be pre-configured by higher layers and provided to MAC layer 814 at the time of configuration of MAC layer 814 when RRC 806 is activated for D2D broadcast communication.

In an aspect, the group ID field 910 and the source ID field 912 may each be 8 bits in size. The source ID field 912 may include a source ID (e.g., an 8 bit value) or transmitter ID indicating the identity of the transmitter in the group. The source ID may be pre-configured in the UE (e.g., UE 708) in a manner similar to the group ID. The MAC subheader 900 may be used each time a MAC SDU is to be broadcasted by the UE 708 for D2D communication.

Figure 10:
FIG. 10 is a diagram illustrating a format of a MAC subheader for D2D broadcast communication.

FIG. 10 is a diagram illustrating a format of a MAC subheader 1000 for D2D broadcast communication. As shown in FIG. 10, the MAC subheader 1000 inlcudes reserved header fields 1002 and 1004, extension header field 1006, LCID field 1008, session ID field 1010, group ID field 1012, source ID field 1014, format field 1016, and length field 1018. In the configuration of FIG. 10, the session ID field 1010 may identify a particular session to allow UEs involved in D2D communication to distinguish sessions.

FIG. 11 is a diagram illustrating a format of a MAC subheader 1100 for D2D broadcast communication. As shown in FIG. 11, the MAC subheader 1100 inlcudes reserved header fields 1102 and 1104, extension header field 1106, LCID field 1108, session ID field 1110, num group field 1112, group ID 1 field 1114, group ID n field 1116, source ID field 1118, format field 1120, and length field 1122.

In an aspect, one UE may be part of multiple groups. In such aspect, the groups to which a UE belongs can be indicated using the multiple group ID fields (e.g., group ID 1 to group ID n) included in the MAC subheader 1100. In an aspect, the num group field 1112 indicates the number of group IDs present in the MAC subheader 1100.

Figure 12:
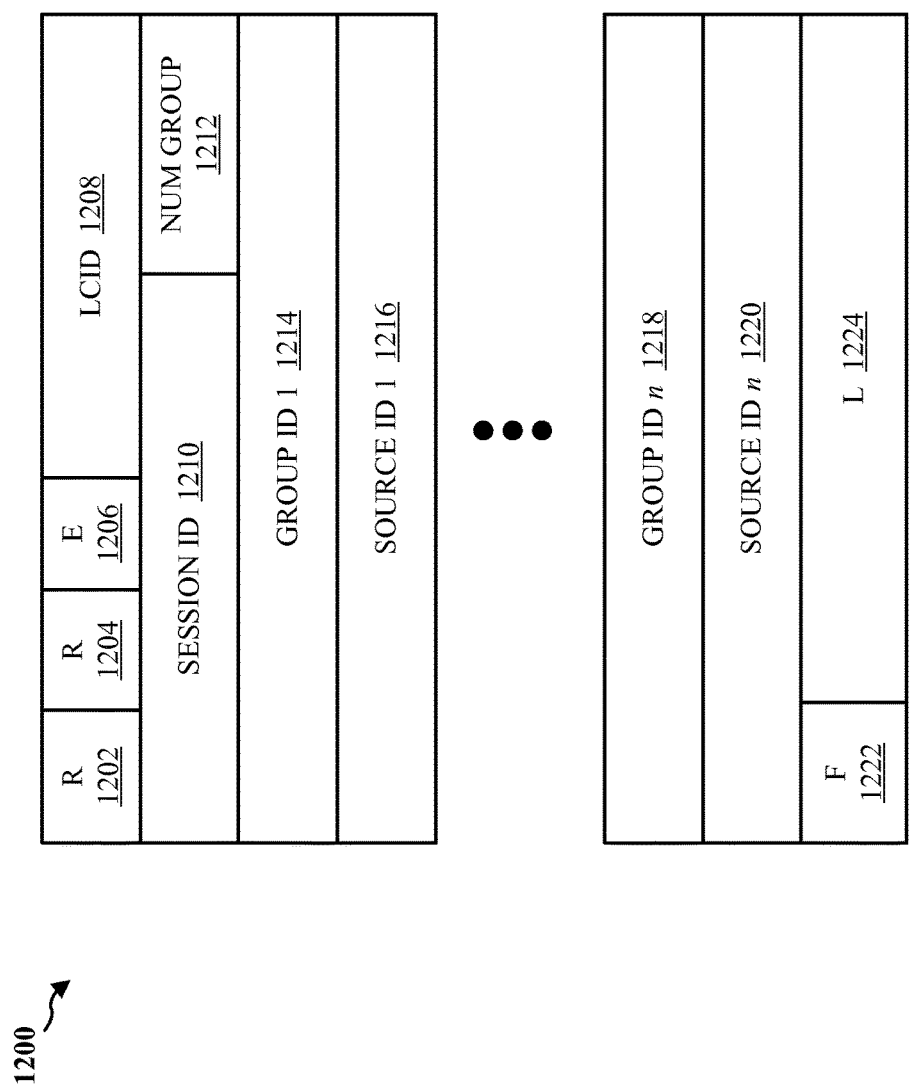
FIG. 12 is a diagram illustrating a format of a MAC subheader for D2D broadcast communication.

FIG. 12 is a diagram illustrating a format of a MAC subheader 1200 for D2D broadcast communication. As shown in FIG. 12, the MAC subheader 1200 inlcudes reserved header fields 1202 and 1204, extension header field 1206, LCID field 1208, session ID field 1210, num group field 1212, group ID 1 field 1214, source ID 1 field 1216, group ID n field 1218, source ID n field 1220, format field 1222, and length field 1224.

In an aspect, one UE may be part of multiple groups and may have a corresponding source ID for each of the groups. For example, each source ID indicated in the source ID 1 field 1216 and the source ID n field 1220 may be different. The number of group ID and source ID pairs included in the MAC subheader 1200 may be indicated in the num group field 1212.

FIG. 13 is a diagram illustrating a format of a MAC subheader 1300 for D2D broadcast communication. As shown in FIG. 13, the MAC subheader 1300 inlcudes reserved header fields 1302 and 1304, extension header field 1306, LCID field 1308, session ID field 1310, SDU number field 1312, group ID field 1314, source ID field 1316, format field 1318, and length field 1320.

D2D broadcast for public safety may not have physical layer feedback (e.g., HARQ feedback), therefore physical layer packets may be repeatedly transmitted multiple times in order to achieve reliable communication. Accordingly, some UEs may receive the same packets multiple times. Notwithstanding that the PDCP layer provides duplicate packet detection, it may be efficient to discard duplicate packets at the MAC layer so that processing at the PDCP level related to header decompression may be avoided. Accordingly, in an aspect, the SDU number field 1312 may carry information including one or more bits and may wrap around so that duplicate packets can be detected. In an aspect, if the SDU number field 1312 is configured to include only one bit, then the SDU field 1312 toggles between 0 and 1. It should be appreciated that the SDU number field 1312 may be combined with other aspects discussed herein to enable duplicate packet detection.

Figure 14:
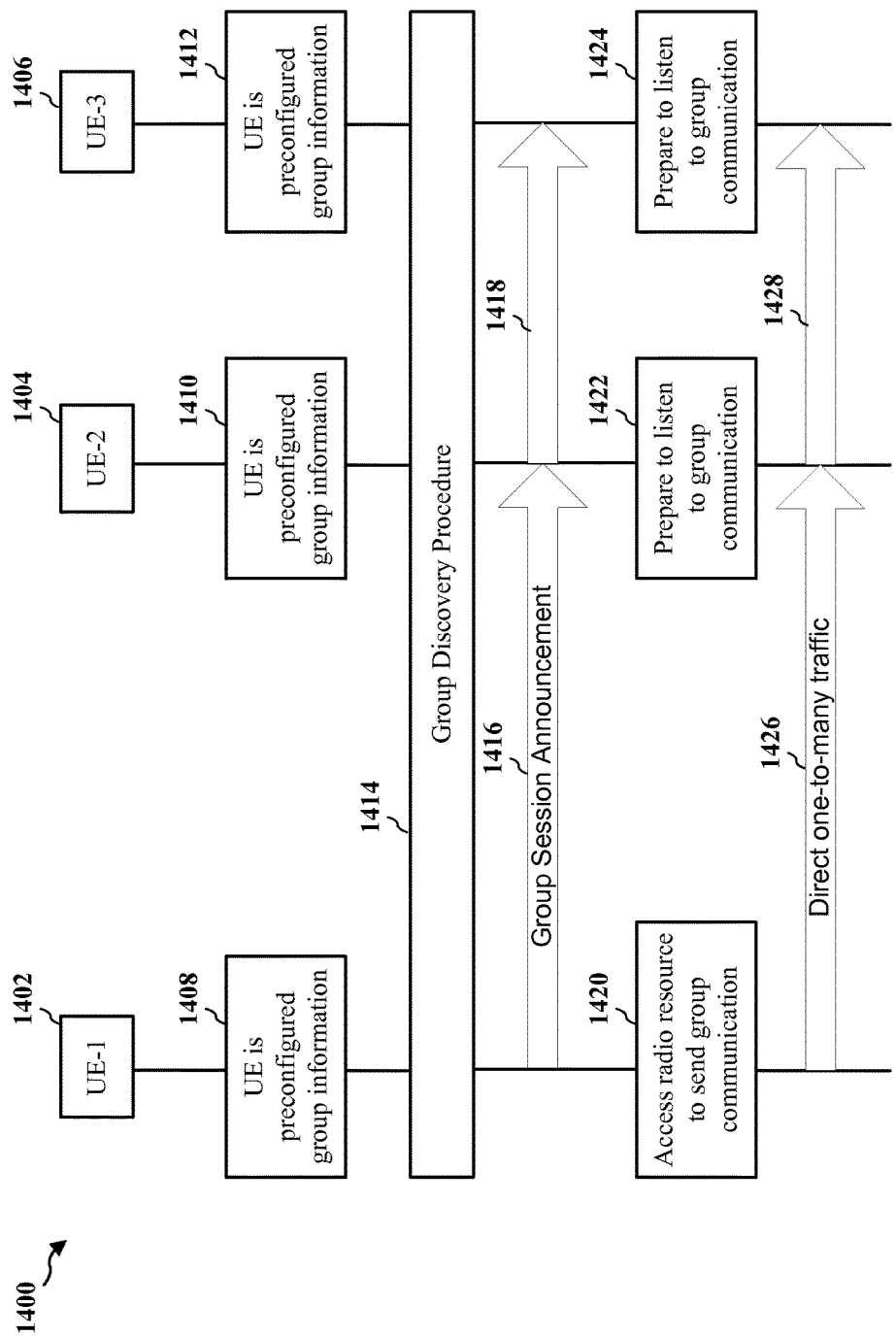
FIG. 14 is a diagram illustrating a high level procedure of direct one-to-many broadcast communication for public safety.

FIG. 14 is a diagram 1400 illustrating a high level procedure of direct one-to-many broadcast communication for public safety. As shown in FIG. 14, multiple UEs (e.g., UE-1 1402, UE-2 1404, UE-3 1406) are each preconfigured with group information 1408, 1410, 1412 and subsequently perform a group discovery procedure 1414. Once the public safety application is activated in a UE, the UE starts monitoring all the broadcast channels to see if there is any packet from the group it is interested in. This always monitoring mode can increase power consumption. Therefore, to optimize the power consumption, a group session announcement 1416, 1418 can be used. For example, all the UEs periodically monitor certain radio resources for the announcement of a member UE from the group of interest. The announcement is an indication that the UE is about to broadcast data so that all the UEs of the group start monitoring all broadcasts continuously. A UE (e.g., UE-1 1402) that sends the group session announcement 1416 may access radio resources 1420 to send a group communication and the other UEs (e.g., UE-2 1404 and UE-3 1406) may prepare to listen to the group communication 1422, 1424. The UE (e.g., UE-1 1402) may then transmit to the other UEs (e.g., UE-2 1404 and UE-3 1406) 1426, 1428.

Figure 15:
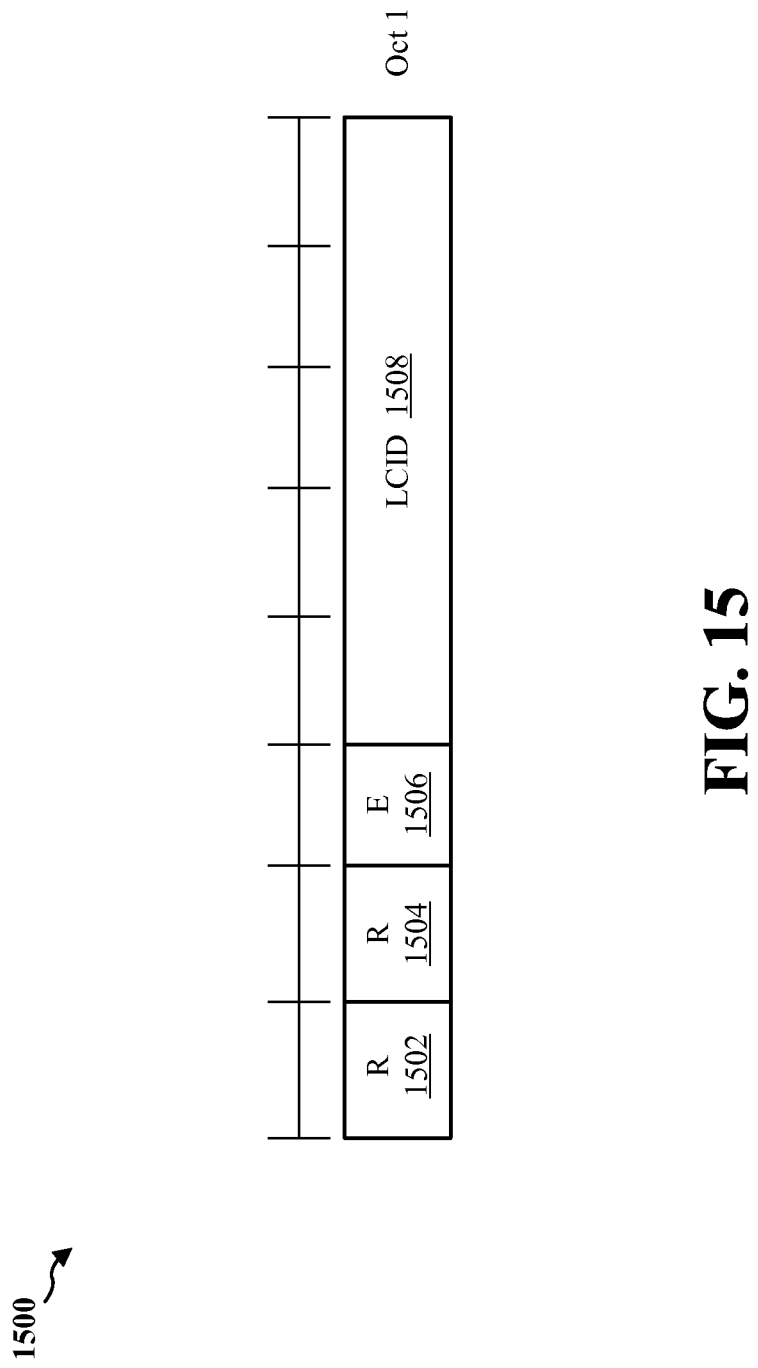
FIG. 15 is a diagram illustrating a MAC subheader for a new MAC control element (CE) used in D2D broadcast communication.

FIG. 15 is a diagram illustrating a MAC subheader 1500 for a new MAC control element (CE) used in D2D broadcast communication. As shown in FIG. 15, the MAC subheader 1500 inlcudes reserved header fields 1502 and 1504, extension header field 1506, and LCID field 1508. In an aspect, the LCID field 1508 may include a new LCID in the uplink defined for a new MAC CE as described infra. The new MAC CE may be used for a group session announcement.

Figure 16:
FIG. 16 is a diagram illustrating a format of a new MAC CE for group session announcement in D2D broadcast communication.

FIG. 16 is a diagram illustrating a format of a new MAC CE 1600 for group session announcement in D2D broadcast communication. In an aspect, the MAC CE 1600 may include a group ID field 1602 and a source ID field 1604.

FIG. 17 is a diagram illustrating a format of a new MAC CE 1700 for group session announcement in D2D broadcast communication. In an aspect, the MAC CE 1700 may include a session ID field 1702, group ID field 1704, and a source ID field 1706.

FIG. 18 is a diagram illustrating a format of a new MAC CE 1800 for group session announcement in D2D broadcast communication. In an aspect, the MAC CE 1800 may include a group ID field 1802, a source ID field 1804, a priority field 1806, and a time interval (also referred to as "NA Time") field 1808. In an aspect, the priority field 1806 may indicate a priority of the session and the NA Time field 1808 may include a time interval for which a lower priority session of a same or other group should not start.

In an aspect, the priority of a session may be preconfigured in the UE. In another aspect, the priority may be activated by user of the UE via the public safety application. For example, when a user increases the priority of a session, other UEs involved in lower priority group communications may yield (e.g., wait to transmit) to higher priority communications for a time (e.g., NA Time) indicated in the MAC CE 1800. Such yielding may result in power savings for the UEs involved in lower priority group communications.

It should be appreciated that in other aspects, the MAC CEs 1600, 1700, and/or 1800 may include multiple group IDs, multiple group ID and source ID pairs, and/or a field indicating the number of group IDs or group ID/source ID pairs present in MAC CE.

Figure 19:
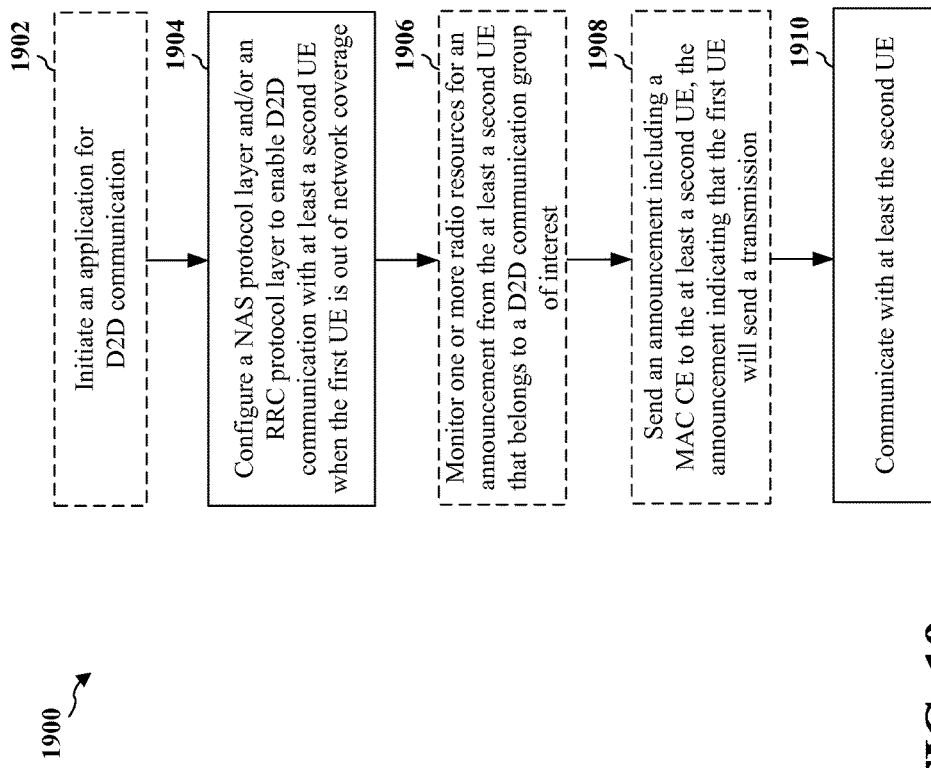
FIG. 19 is a flow chart of a method of wireless communication.

FIG. 19 is a flow chart 1900 of a method of wireless communication. The method may be performed by a UE (also referred to as a first UE), such as UE 708 in FIG. 7. At step 1902, the UE initiates an application for D2D communication. For example, the application may be a public safety application used for communicating emergency messages by members of a police or fire department.

At step 1904, the UE configures a NAS protocol layer and/or an RRC protocol layer to enable D2D communication with at least a second UE (e.g., UE 710 in FIG. 7) when the first UE is out of network coverage. In an aspect, the UE configures the NAS protocol layer and/or the RRC protocol layer in response to the initiation of the application. In an aspect, configuration of the NAS protocol layer inlcudes setting at least an IP address for the first UE, a priority for the first UE when the first UE belongs to a D2D communication group, or an IP multicast address when the first UE belongs to the D2D communication group.

In an aspect, the NAS protocol layer configures at least a bearer for the D2D communication or one or more traffic flow templates (TFTs). In an aspect, configuration of the RRC protocol layer inlcudes transitioning the RRC protocol layer to a D2D communication state (e.g., a D2D-Idle state or D2D-Connected state). In an aspect, the RRC protocol layer in the D2D communication state configures one or more protocol layers for the D2D communication. For example, the one or more protocol layers may include a PDCP layer, an RLC layer, a MAC layer, or a physical layer (L1). In an aspect, the RRC protocol layer in the D2D communication state configures at least the PDCP layer or the RLC layer to operate in a U-Mode.

In an aspect, the RRC protocol layer in the D2D communication state configures a MAC layer to generate a MAC subheader, the MAC subheader comprising at least a session ID, a group ID that indicates a D2D communication group to which the first UE belongs, or a source ID that indicates an ID associated with the first UE. In an aspect, the MAC subheader may include group number information that indicates a number of group IDs included in the MAC subheader. In an aspect, the MAC subheader may include duplicate packet identification information. In an aspect, the MAC subheader may include a priority, or a time interval for which a lower priority session should not start.

In an aspect, the RRC protocol layer in the D2D communication state configures a MAC layer to generate a MAC CE including at least a group ID that indicates a D2D communication group to which the first UE belongs, a source ID that indicates an ID associated with the first UE, a priority, and/or a time interval for which a lower priority session should not start.

At step 1906, the UE monitors one or more radio resources for an announcement from the at least a second UE that belongs to a D2D communication group of interest.

At step 1908. The UE sends an announcement including a MAC CE to the at least a second UE, the announcement indicating that the first UE will send a transmission.

At step 1910, the UE communicates with at least the second UE.

It should be understood that the steps indicated by dotted lines in FIG. 19 (e.g., steps 1902, 1906, and 1908) are optional steps. For example, steps 1904 and 1910 may be performed without performing steps 1902, 1906, and 1908. As another example, steps 1902, 1904 and 1910 may be performed without performing steps 1906 and 1908.

Figure 20:
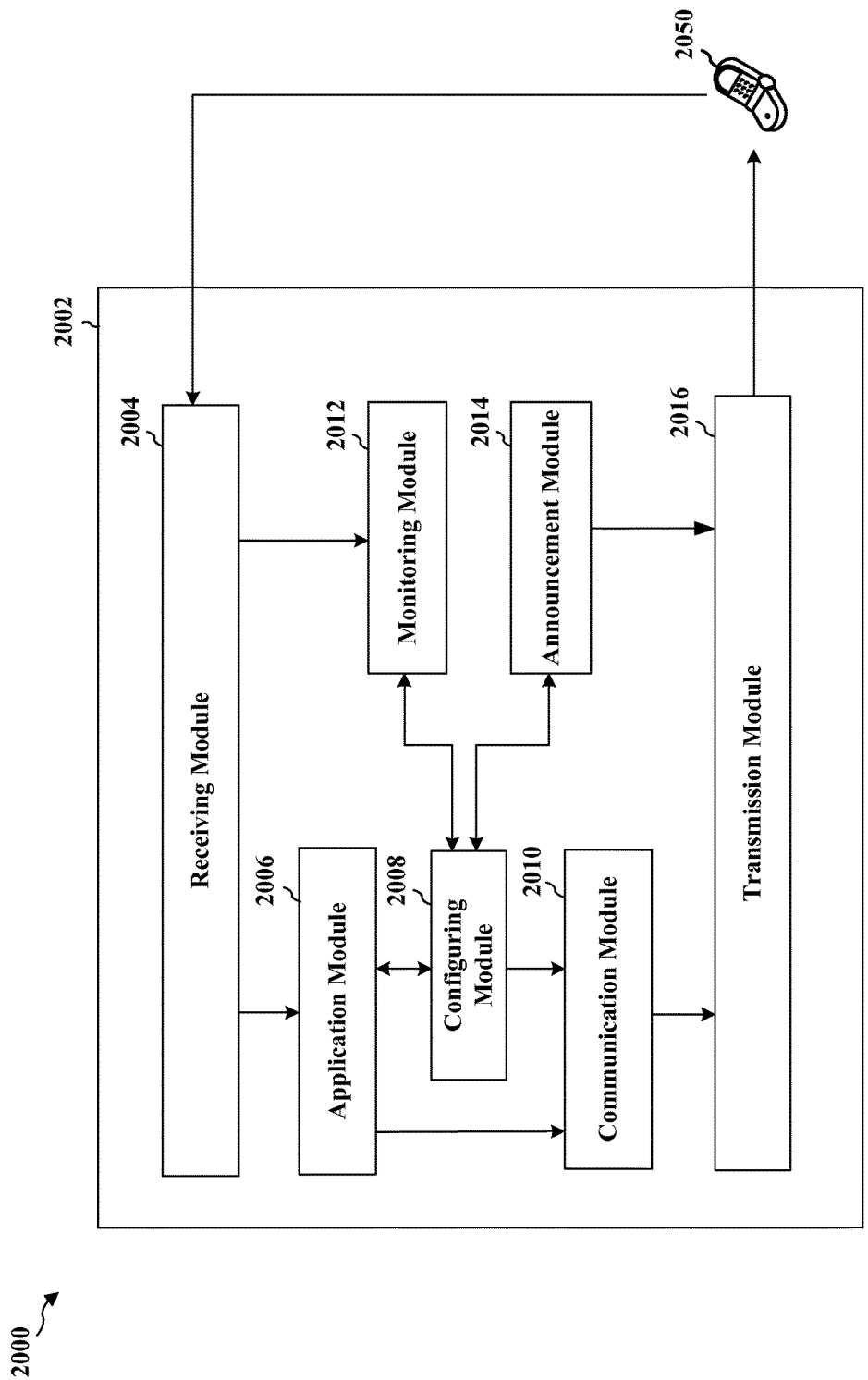
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2002. The apparatus may be a UE (also referred to as a first UE). The apparatus includes a module 2004 that receives D2D communications from another UE (e.g., UE 2050), a module 2006 that initiates an application for D2D communication, a module 2008 that configures a NAS protocol layer and/or an RRC protocol layer to enable D2D communication with at least a second UE when the first UE is out of network coverage, a module 2010 that communicates with at least the second UE, a module 2102 that monitors one or more radio resources for an announcement from the at least a second UE that belongs to a D2D communication group of interest, a module 2014 that sends an announcement including a MAC CE to at least the second UE, the announcement indicating that the first UE will send a transmission, and a module 2016 for sending D2D transmissions to another UE (e.g., UE 2050).

The apparatus may include additional modules that perform each of the steps of the algorithm in the aforementioned flow chart of FIG. 19. As such, each step in the aforementioned flow chart of FIG. 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
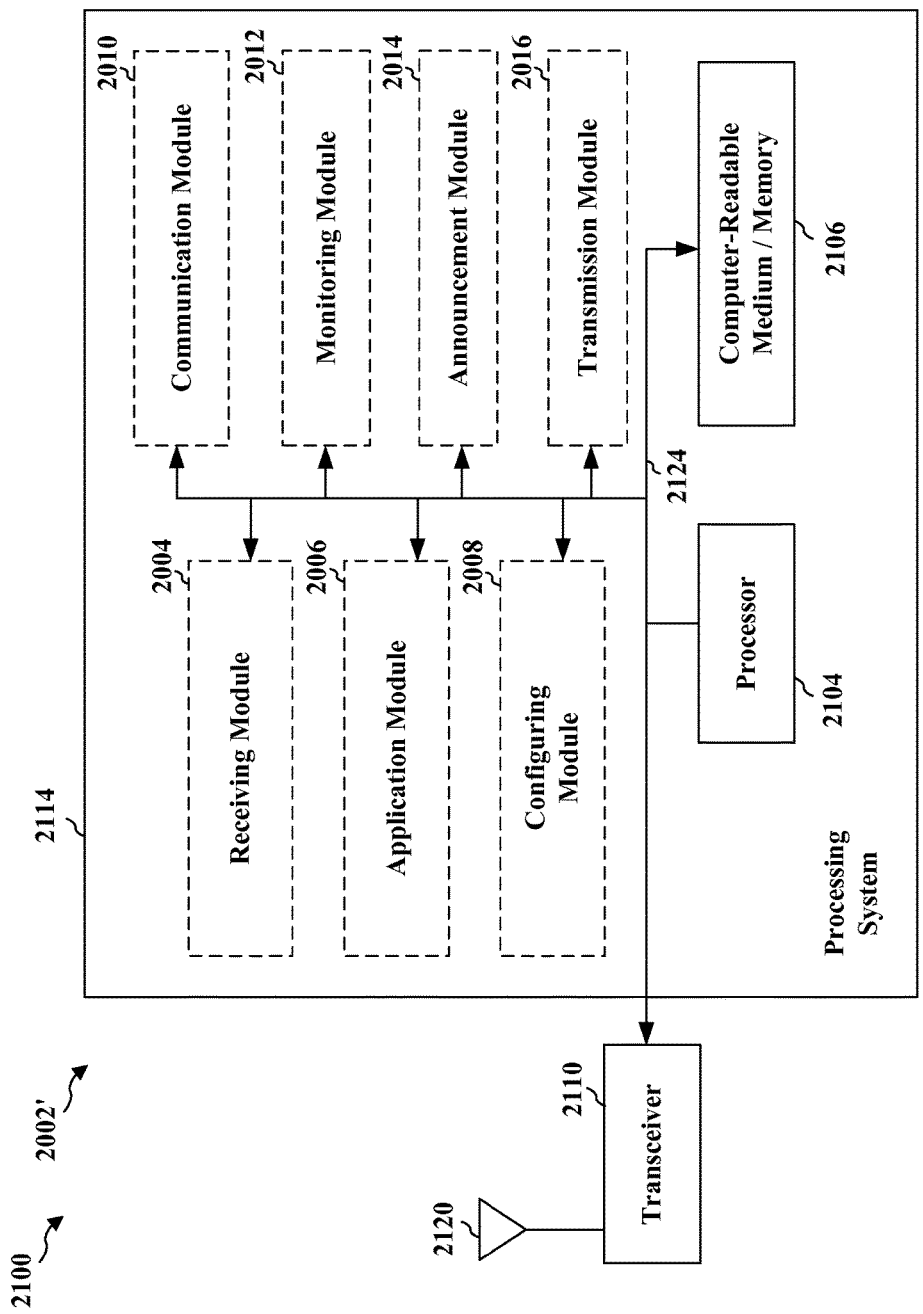
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2004, 2006, 2008, 2010, 2012, 2014, and 2016, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the receiving module 2004. In addition, the transceiver 2110 receives information from the processing system 2114, specifically the transmission module 2016, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system further includes at least one of the modules 2004, 2006, 2008, 2010, 2012, 2014, and 2016. The modules may be software modules running in the processor 2104, resident/stored in the computer readable medium/memory 2106, one or more hardware modules coupled to the processor 2104, or some combination thereof. The processing system 2114 may be a component of the UE 650 and may include the memory 660 and/or at least one of the TX processor 668, the RX processor 656, and the controller/processor 659.

In one configuration, the apparatus 2002/2002' for wireless communication includes means for initiating an application for the D2D communication, means for configuring a NAS protocol layer and/or an RRC protocol layer to enable D2D communication with at least a second UE when the first UE is out of network coverage, means for monitoring one or more radio resources for an announcement from the at least a second UE that belongs to a D2D communication group of interest, means for sending an announcement including a MAC CE to the at least a second UE, and means for communicating with the at least a second UE. The aforementioned means may be one or more of the aforementioned modules of the apparatus 2002 and/or the processing system 2114 of the apparatus 2002' configured to perform the functions recited by the aforementioned means. As described supra, the processing system 2114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a first user equipment (UE), comprising:
    configuring, the first UE to belong to one or more device-to-device (D2D) communication groups;
    configuring, at the first UE, at least a non-access stratum (NAS) protocol layer or a radio resource control (RRC)

protocol layer to enable D2D communication with a second UE when the first UE is out of network coverage, wherein configuring the RRC protocol layer further comprises transitioning the RRC protocol to a D2D communication state and when configuring the RRC protocol layer, the RRC protocol layer configures a medium access control (MAC) layer to generate a MAC subheader, the MAC subheader comprising group number information that indicates a number of group identities (IDs) included in the MAC subheader, the group IDs indicating the one or more D2D communication groups to which the first UE belongs;

configuring, at the first UE, one or more protocol layers based on the configuring of at least the NAS protocol layer or the RRC protocol layer, the one or more protocol layers different from the NAS protocol layer and the RRC protocol layer; and communicating with the second UE.

2. The method of claim 1, further comprising initiating an application for the D2D communication, wherein the configuring the at least a NAS protocol layer or RRC protocol layer is performed in response to the initiation of the application.

3. The method of claim 1, wherein configuring the NAS protocol layer comprises setting at least an Internet Protocol (IP) address for the first UE, a priority for the first UE when the first UE belongs to a D2D communication group, or an IP multicast address when the first UE belongs to the D2D communication group.

4. The method of claim 1, wherein the NAS protocol layer configures at least a bearer for the D2D communication or one or more traffic flow templates (TFTs).

5. The method of claim 1, wherein the RRC protocol layer in the D2D communication state configures the one or more protocol layers for the D2D communication.

6. The method of claim 5, wherein the one or more protocol layers comprises at least a packet data convergence protocol (PDCP) layer, an radio link control (RLC) layer, a medium access control (MAC) layer, or a physical layer.

7. The method of claim 6, wherein the RRC protocol layer in the D2D communication state configures at least the PDCP layer or the RLC layer to operate in a unidirectional mode (U-Mode).

8. The method of claim 1, wherein the MAC subheader further comprising at least a session ID, or a source ID that indicates an ID associated with the first UE.

9. The method of claim 8, the MAC subheader further comprising duplicate packet identification information.

10. The method of claim 8, the MAC subheader further comprising, a priority, or a time interval for which a lower priority session should not start.

11. The method of claim 1, wherein the RRC protocol layer in the D2D communication state configures the MAC layer to generate a MAC control element (CE) comprising at least the group IDs that indicate the one or more D2D communication groups to which the first UE belongs, a source ID that indicates an ID associated with the first UE, a priority, or a time interval for which a lower priority session should not start.

12. The method of claim 11, further comprising sending an announcement comprising the MAC CE to the at least a second UE, the announcement indicating that the first UE will send a transmission.

13. The method of claim 1, further comprising monitoring one or more radio resources for an announcement from the at least a second UE that belongs to a D2D communication group of interest.

14. A first user equipment (UE) for wireless communication, comprising:
means for configuring, the first UE to belong to one or more device-to-device (D2D) communication groups;
means for configuring, at the first UE, at least a non-access stratum (NAS) protocol layer or a radio resource control (RRC) protocol layer to enable D2D communication with a second UE when the first UE is out of network coverage, wherein configuring the RRC protocol layer further comprises transitioning the RRC protocol to a D2D communication state and when configuring the RRC protocol layer, the RRC protocol layer configures a medium access control (MAC) layer to generate a MAC subheader, the MAC subheader comprising group number information that indicates a number of group identities (IDs) included in the MAC subheader, the group IDs indicating the one or more D2D communication groups to which the first UE belongs;
means for configuring, at the first UE, one or more protocol layers based on the configuring of at least the NAS protocol layer or the RRC protocol layer, the one or more protocol layers different from the NAS protocol layer and the RRC protocol layer; and
means for communicating with the second UE.

15. The first UE of claim 14, further comprising means for initiating an application for the D2D communication, wherein the configuring the at least a NAS protocol layer or RRC protocol layer is performed in response to the initiation of the application.

16. The first UE of claim 14, further comprising means for sending an announcement comprising a MAC CE to the at least a second UE, the announcement indicating that the first UE will send a transmission.

17. The first UE of claim 14, further comprising means for monitoring one or more radio resources for an announcement from the at least a second UE that belongs to a D2D communication group of interest.

18. A first user equipment (UE) for wireless communication, comprising:
a memory; and
at least one processor coupled to the memory and configured to:
configure, the first UE to belong to one or more device-to-device (D2D) communication groups;
configure, at the first UE, at least a non-access stratum (NAS) protocol layer or a radio resource control (RRC) protocol layer to enable D2D communication with a second UE when the first UE is out of network coverage, wherein configuring the RRC protocol layer further comprises transitioning the RRC protocol to a D2D communication state and when configuring the RRC protocol layer, the RRC protocol layer configures a medium access control (MAC) layer to generate a MAC subheader, the MAC subheader comprising group number information that indicates a number of group identities (IDs) included in the MAC subheader, the group IDs indicating the one or more D2D communication groups to which the first UE belongs;
configure, at the first UE, one or more protocol layers based on the configuring of at least the NAS protocol layer or the RRC protocol layer, the one or more protocol layers different from the NAS protocol layer and the RRC protocol layer; and
communicate with the second UE.

19. The first UE of claim 18, the at least one processor further configured to initiate an application for the D2D communication, wherein the configuring the at least a NAS protocol layer or RRC protocol layer is performed in response to the initiation of the application.

20. The first UE of claim 18, wherein configuring the NAS protocol layer comprises setting at least an Internet Protocol (IP) address for the first UE, a priority for the first UE when the first UE belongs to a D2D communication group, or an IP multicast address when the first UE belongs to the D2D communication group.

21. The first UE of claim 18, wherein the NAS protocol layer configures at least a bearer for the D2D communication or one or more traffic flow templates (TFTs).

22. The first UE of claim 18, wherein the RRC protocol layer in the D2D communication state configures the one or more protocol layers for the D2D communication.

23. The first UE of claim 18, wherein the MAC subheader further comprising at least a session ID, or a source ID that indicates an ID associated with the first UE.

24. The first UE of claim 18, wherein the RRC protocol layer in the D2D communication state configures the MAC layer to generate a MAC control element (CE) comprising at least the group IDs that indicate the one or more D2D communication groups to which the first UE belongs, a source ID that indicates an ID associated with the first UE, a priority, or a time interval for which a lower priority session should not start.

25. The first UE of claim 24, the at least one processor further configured to send an announcement comprising the MAC CE to the at least a second UE, the announcement indicating that the first UE will send a transmission.

26. The first UE of claim 18, the at least one processor further configured to monitor one or more radio resources for an announcement from the at least a second UE that belongs to a D2D communication group of interest.

27. A non-transitory computer-readable medium storing computer-executable code for a first user equipment (UE), comprising code to:
configure, the first UE to belong to one or more device-to-device (D2D) communication groups;
configure, at the first UE, at least a non-access stratum (NAS) protocol layer or a radio resource control (RRC) protocol layer to enable D2D communication with a second UE when the first UE is out of network coverage, wherein configuring the RRC protocol layer further comprises transitioning the RRC protocol to a D2D communication state and when configuring the RRC protocol layer, the RRC protocol layer configures a medium access control (MAC) layer to generate a MAC subheader, the MAC subheader comprising group number information that indicates a number of group identities (IDs) included in the MAC subheader, the group IDs indicating the one or more D2D communication groups to which the first UE belongs;
configure, at the first UE, one or more protocol layers based on the configuring of at least the NAS protocol layer or the RRC protocol layer, the one or more protocol layers different from the NAS protocol layer and the RRC protocol layer; and
communicate with the second UE.

* * * * *